July 26, 1960
J. P. CHADOWSKI
2,946,842
AUTOMOBILE ANTENNA
Filed Feb. 24, 1959
3 Sheets-Sheet 1
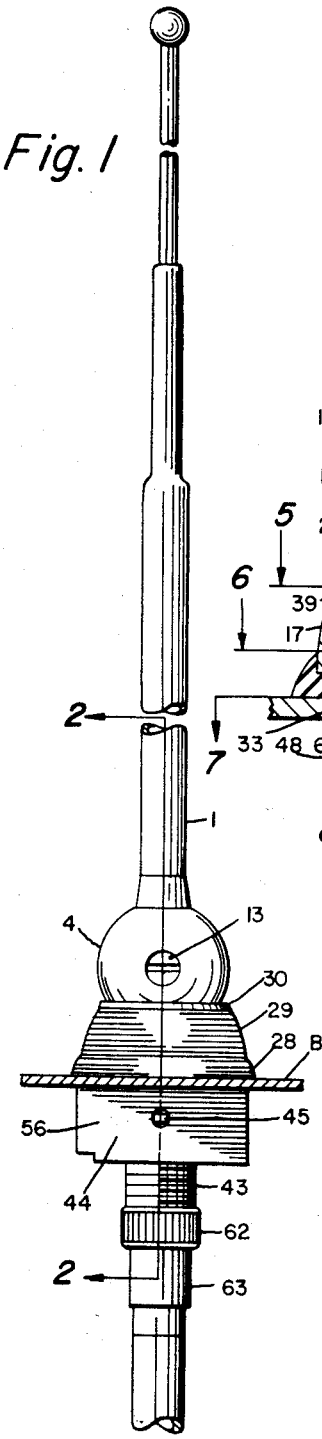
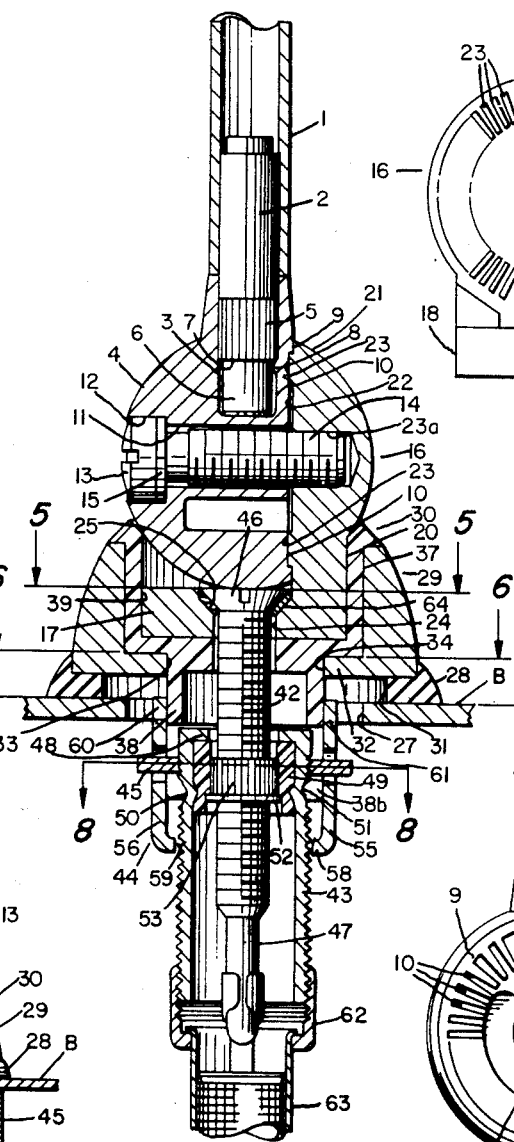
INVENTOR.
JOSEPH P. CHADOWSKI
BY
Isler & Ornstein
ATTORNEYS July 26, 1960 J. P. CHADOWSKI 2,946,842
AUTOMOBILE ANTENNA
Filed Feb. 24, 1959 3 Sheets-Sheet 2

INVENTOR.
JOSEPH P. CHADOWSKI
BY
*Isler & Ornstein*
ATTORNEYS

July 26, 1960   J. P. CHADOWSKI   2,946,842
AUTOMOBILE ANTENNA

Filed Feb. 24, 1959   3 Sheets-Sheet 3

INVENTOR.
JOSEPH P. CHADOWSKI
BY
ATTORNEYS

United States Patent Office 2,946,842
Patented July 26, 1960

2,946,842
AUTOMOBILE ANTENNA

Joseph P. Chadowski, Cleveland, Ohio, assignor, by mesne assignments, to New-Tronics Corp., Cleveland, Ohio, a corporation of Ohio Filed Feb. 24, 1959, Ser. No. 795,134

8 Claims. (Cl. 174—153)

This invention relates generally to automobile antennas, but has reference more particularly to an antenna of the "top mount" type, i.e.; of the type which can be installed in an opening in the automobile body or fender, and without requiring access by the installer to the space within the body beneath said opening.

In so-called "top mount" automobile antennas, of the type disclosed, for example, in Patent No. 2,758,151, ball and socket elements are mounted on a resilient or soft rubber pad, which is intended to insulate the antenna proper from the body of the automobile.

These rubber mountings are affected by weather conditions, the rubber, in many cases, absorbing moisture or water, thereby creating an electrical leakage to the ground, which shorts out the antenna, and causes loss of a portion of the radio frequency signals.

Other disadvantages inherent in the use of existing antennas of this type are (a) difficulty in mounting or installing the antenna on the automobile body, and (b) failure to obtain a good ground connection, due to poor or insufficient contact of the clamping elements with the body and other parts.

The present invention has, as its primary object, the provision of an antenna of this type, in which the receptivity of the antenna is not affected by weather conditions, water or moisture.

Another object of the invention is to provide an antenna of the character described, which can be quickly and easily mounted or installed on an automobile body, with a minimum of effort and by the use of a single conventional tool, such as a screw driver.

A further object of the invention is to provide an antenna of the character described, having incorporated therein a clamping element which affords an excellent grounding connection for the antenna.

Other objects and advantages of my invention will be apparent during the course of the following description.

In the accompanying drawings forming a part of this specification, and in which like numerals are employed to designate like parts throughout the same, Fig. 1 is a fragmentary side elevational view of the antenna, as mounted on an automobile body or fender;

Fig. 2 is a fragmentary cross-sectional view, on an enlarged scale, taken on the line 2—2 of Fig. 1;

Fig. 3 is an elevational view of the inner face of one of the spherical segments of the antenna;

Fig. 4 is an elevational view of the inner face of the other spherical segment of the antenna;

Figure 5:
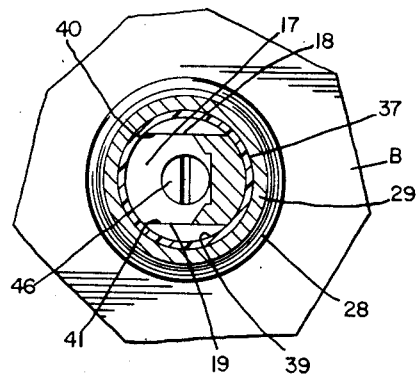
Fig. 5 is a transverse cross-sectional view, taken on the line 5—5 of Fig. 2.
Figure 6:
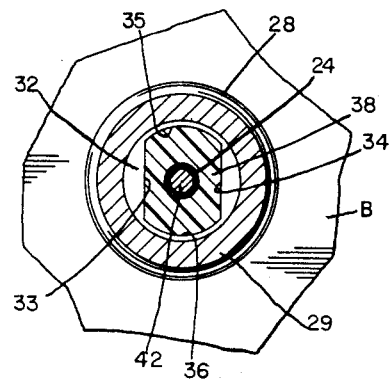
Fig. 6 is a transverse cross-sectional view, taken on the line 6—6 of Fig. 2.

Referring more particularly to the drawings, there is disclosed an automobile antenna, shown in this instance as one of the telescopic variety, and comprising a lower or stationary tubular section 1, the lower end of which is pressed-fitted onto a plug 2.

The plug 2 is pressed into an opening 3 of a ball or spherical segment 4, and is provided with a knurled portion 5, which provides a good frictional contact of the plug with the wall of said opening, and is also effective to prevent rotation of the plug in the opening. A portion 6 of the plug, below the knurled portion 5, is of a diameter slightly less than that of the knurled portion, forming a shoulder 7. After the plug has been fully inserted in the opening 3, by means of a press fit, the plug is further staked to the ball segment by forming a cone point 8 on the ball segment, directly beneath the shoulder 7, as best seen in Fig. 2, thereby effectively preventing axial displacement of the plug from the ball segment, once it has been staked to the latter.

The ball segment 4 is provided at one side with a flat face 9 of substantially circular form, and provided with a multiplicity of circumferentially-spaced grooves or recesses 10, preferably extending radially of this face, and serving a purpose to be presently described.

The ball segment 4 is also provided with a bore 11 extending from the face 9 and diametrically through the ball segment and counterbored, as at 12, for the reception of the head 13 of a fillister head screw 14, and a lock washer 15.

The antenna further includes an element generally designated by reference numeral 16, and comprising a flat, generally circular base portion 17, provided at diametrically-opposite sides thereof with flat vertical surfaces 18 and 19. This base portion 17 is extended upwardly at one side, as at 20, and this extension terminates in a ball or spherical segment 21, which, in combination with the segment 4, forms a substantially complete sphere or ball.

The segment 21 is provided at one side with a flat face 22 of substantially circular form, and provided with a multiplicity of circumferentially-spaced ribs 23, extending radially of this face, and adapted to be received in the grooves 10 of the segment 4, so as to prevent circumferential movement of the segments 4 and 21 relatively to each other, after these segments have been secured together.

The segment 21 is also provided with a threaded opening 23a extending from the face 22 and adapted to receive the stem of the screw 14, when the segments 4 and 21 are secured together, as shown in Fig. 2.

The base portion 17 of the element 16 is provided with a central vertical opening 24, which is counterbored to provide a conical seat 25, for a purpose to be presently described.

The automobile body or fender B, on which the antenna is to be mounted, has a circular opening 27 therein, and for the purpose of mounting the antenna parts which have been described on the body in alignment with this opening, parts 28, 39 and 30 have been provided. Part 28 is a rubber pad, which rests on the body B, and has an opening 31 of a diameter considerably larger than that of the opening 27. The part 29 is a metal collar, which rests on the pad 28 and has a base portion 32 provided with an opening defined by parallel sides 33 and 34 and arcuate ends 35 and 36. The part 30 is a base member, of generally circular contour, and molded in a single piece, from an insulating plastic, such as high impact polystyrene.

The base 30 is snugly received in the collar 29, and has an upper portion 37 which rests on the base portion 32 of the collar, and a lower portion 38 of an external contour corresponding to that of the opening in the base portion 32 of the collar, and extending through said opening and through the opening 31 of the pad 28 and opening 27 in the body B. The distance between the arcuate ends of the external surface of the lower portion 38 of the base 30 is such that the portion 38 just slips through the opening 27 (see Fig. 7), so that the portion 38 acts as a pilot, to center the base 30 with respect to the axis of the opening 27. The lower portion 38 of the base 30 terminates in spaced arcuate extensions 38a and 38b.

The upper portion 37 of the base 30 has a recess 39 therein, of a contour adapted to receive the base portion 17 and extension 20 of the element 16, the lower portion of this recess having diametrically-opposed flat side walls 40 and 41 which are disposed adjacent the sides 18 and 19 respectively, of the base portion 17 so that the antenna will be properly oriented within the base 30, and will be locked against rotation therein. In the same manner, the base 30 is properly oriented within the collar 29 and is locked against rotation relatively to the latter.

For the purpose of securing or clamping the various parts which have been described to the automobile body, a number of additional parts are employed, including a contact screw 42, a sleeve 43, a bracket 44 and a nut 45.

The contact screw 42 has a conical head 46 adapted to seat on the seat 25 of the base portion 17 of the element 16, and terminates at its lower end in a smooth stem 47 of reduced diameter, which provides a contact terminal.

The sleeve 43 is externally threaded and is provided at its upper end with an inwardly extending flange 48 which provides an abutment for the upper end of a bushing 49, made of high impact polystyrene, and which bushing is press-fitted in the upper end of the sleeve 43, and is staked to the sleeve, as by indentations 50 and 51, formed in the sleeve. Secured in the lower end of the bushing 49 is a metallic insert 52, which is secured against rotation within the bushing, as by knurling 53. The insert 52 is internally threaded for the reception of the contact screw 42.

Figure 9:
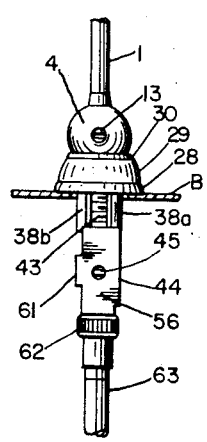
Fig. 9 is a view similar to Fig. 1, but showing the clamping bracket in the position it is placed when the antenna is being installed on the automobile.
Figure 10:
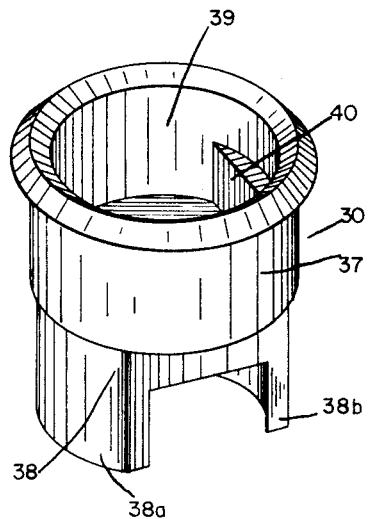
Fig. 10 is a perspective view of the base member of the antenna.
Figure 11:
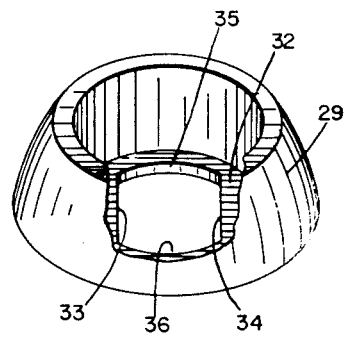
Fig. 11 is a perspective view of the collar, with a portion thereof broken away.
Figure 12:
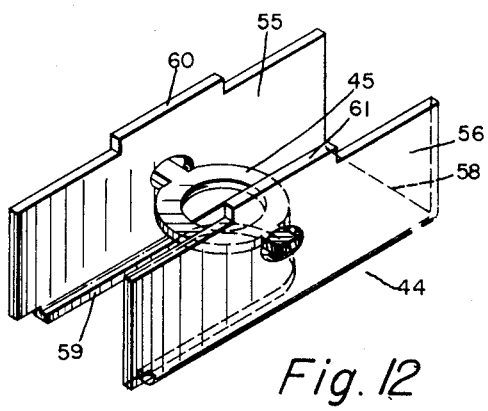
Fig. 12 is a perspective view of the clamping bracket.

The nut 45 is a circular nut which is threadedly secured to the sleeve 43 and is pivotally mounted in the flanges 55 and 56 of the U-shaped bracket 44. The bracket 44 has a base or web portion 58, having a portion thereof removed to provide a recess 59, so that the bracket may be turned from a position of substantial parallelism with the axis of the sleeve 43, as shown in Fig. 9, to a position substantially perpendicular to said axis, as shown in Figs. 1 and 2.

The flanges 55 and 56 of the bracket 44 are of a length substantially greater than the diameter of the opening 27 of the automobile body, and the upper edges of these flanges bear against the underside of the automobile body adjacent the opening 27, when the antenna is in mounted position, as shown in Figs. 1 and 2.

Figure 7:
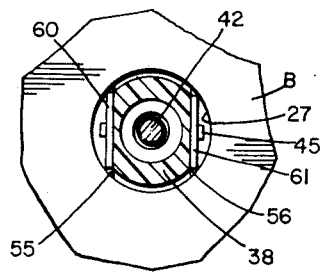
Fig. 7 is a transverse cross-sectional view, taken on the line 7—7 of Fig. 2.
Figure 8:
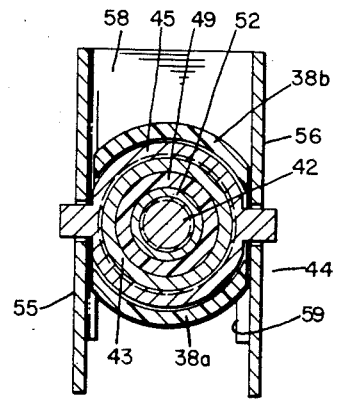
Fig. 8 is a transverse cross-sectional view, taken on the line 8—8 of Fig. 2.

The flanges 55 and 56 are also provided centrally of their upper edges with extensions or tenons 60 and 61, respectively, which are of a length such that when the antenna is mounted, these extensions extend into the opening 27, and their ends engage points of the periphery of the opening 27, as best shown in Fig. 7.

The lower end of the sleeve 43 is adapted for the connection thereto of the connector nut 62 of an antenna lead-in 63.

For the purpose of providing a waterproof connection of the head 46 of the screw 42 with the seat 25 of the base 17 of the element 16, a conical washer 64 of lead is interposed between the head 46 and seat 25, as shown in Fig. 2. This lead washer serves to keep water from getting into the lead-in 63 when washing the car, or from rain or melted snow.

The antenna, as described, will normally be sold as a complete or assembled unit, including the lead-in.

When the antenna is to be mounted, the parts 1, 2, 4, 14 and 15 are first removed from the assembly, so as to permit access to the head 46 of the screw 42.

The screw 42 is then loosened sufficiently from the insert 52 to permit the bracket to be rotated to the position shown in Fig. 9.

The antenna is then mounted on the automobile by holding the ball segment 21 and passing the lead-in 63, bracket 44, sleeve 43, base portion 38 and contact screw 42 through the opening 27 in the body B. The extension 38, as previously described, just slips through the opening 27 and aids in centering the base 30 with respect to the axis of the opening 27.

When the bracket 44 has reached a position approximately as shown in Fig. 9, it will assume a horizontal position, due to the fact that the end thereof remote from the recess 59 is heavier than the other end.

The contact screw 42 is then rotated to draw up the sleeve 43 and bracket 44, and at the conclusion of this drawing-up process, the tenons 60 and 61 enter the opening 27, being aided or piloted into the opening by the flat sides of the portion 38 of the base 30, and the upper edges of the flanges 55 and 56 are firmly clamped to the underside of the body B, adjacent the opening 27.

In this manner, the aforesaid parts of the antenna are securely clamped to the body B, and after the parts have been thus clamped, the parts 1, 2, 4, 14 and 15 are secured to the ball segment 21.

The advantages of the antenna which has been described will be readily apparent to those skilled in this art, but may be briefly described as follows:

(a) The spherical segments and their associated metallic parts are insulated from the body of the automobile by the hard insulating plastic base 30, as well as the rubber pad 28, so that electrical leakage is reduced to a minimum.

(b) The various parts of the antenna are properly oriented with respect to each other, as well as locked against rotation relatively to each other, so that mounting or installation is greatly facilitated.

(c) An excellent ground connection is assured, by reason of the tight contact of the upper edges of the flanges 55 and 56 of the bracket 44 with the underside of the body B, as well as the engagement of the ends of the tenons 60 and 61 with the periphery of the opening 27. This contact is maintained at all times, by reason of the fact that the tenons 60 and 61 are, in a sense, captivated in the opening 27, so that the possibility of the flanges 55 and 56 spreading apart during the clamping action is completely obviated.

(d) The contact screw 42 is well insulated and shielded from the body, and is thus effective to aid in producing good radio reception. Contributing to this result is the fact that the metallic insert 52 is insulated from the sleeve 43 by the bushing 49.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In combination with an automobile body having a circular opening therein, an antenna mounting comprising a soft pad disposed about said opening, a metal collar seated on said pad and having a non-circular opening therein, a base member of insulating material seated in said collar and having a non-circular extension passing entirely through said non-circular opening and through the opening in said body, a metallic spherical segment having a base portion seated on said base member, and a spherical segment complementary to said first segment and removably secured to the latter.

2. The combination, as defined in claim 1, including means for clamping said mounting to said body, said means comprising a screw passing axially through said body opening, a metal sleeve secured to said screw in insulated relationship to said screw, a nut threadedly secured to said sleeve, and a U-shaped bracket pivotally secured to said nut, said bracket having flanges, the upper edges of which bear against the underside of said body adjacent said opening, and tenons extending upwardly from said flanges and into said body opening, said tenons effective to prevent spreading apart of said flanges when said mounting is clamped to said body.

3. The combination, as defined in claim 2, in which the ends of said tenons engage points on the periphery of said body opening.

4. The combination, as defined in claim 3, including means on said base member extension for guiding said tenons into said body opening.

5. The combination, as defined in claim 4, in which said base member extension has a maximum transverse dimension slightly less than the diameter of said body opening.

6. In an antenna of the character described, a supporting pad, a metallic collar supported by said pad, a base member of insulating material supported by said collar, a spherical segment having a convex spherical exposed face and having a base portion disposed within said base member and insulated from said collar, a spherical segment complementary to said first-named segment and removably secured to the latter, and means for clamping said pad, base member and first-named spherical segment to an automobile body, said means comprising a headed screw extending entirely through said base portion, base member and collar, and accessible from above said base portion, a sleeve secured to said screw and axially movable relatively to said screw, a nut threadedly secured to said sleeve, and a clamp bracket pivotally secured to said nut.

7. An antenna, as defined in claim 6, including means for insulating said screw from said sleeve.

8. An antenna, as defined in claim 6, in which said bracket has a base, a portion of which is removed to provide a recess, whereby the bracket may be rotated from a position at right angles to said sleeve to a position parallel with the axis of the sleeve.

References Cited in the file of this patent

UNITED STATES PATENTS

| | | |
|---|---|---|
| 2,388,054 | Hartzell | Oct. 30, 1945 |
| 2,444,189 | Finneburgh et al. | June 29, 1948 |
| 2,758,151 | Spector et al. | Aug. 7, 1956 |
| 2,795,130 | Pritchett | June 11, 1957 |
| 2,833,849 | Abel | May 6, 1958 |
| 2,859,274 | Cejka | Nov. 4, 1958 |

FOREIGN PATENTS

| | | |
|---|---|---|
| 112,401 | Australia | Feb. 6, 1941 |